United States Patent [19]
Fournier

[11] Patent Number: 5,931,287
[45] Date of Patent: Aug. 3, 1999

[54] LOADING DEVICE HAVING MULTIPLE TONGS FOR HANDLING LUMBER AND THE LIKE

[75] Inventor: Germain Fournier, Quebec, Canada

[73] Assignee: Maintenance M.G.F. Inc., Quebec, Canada

[21] Appl. No.: 09/080,306

[22] Filed: May 18, 1998

Related U.S. Application Data

[63] Continuation of application No. 08/715,269, Sep. 16, 1996, Pat. No. 5,752,594.

[51] Int. Cl.$^6$ .................................................. B65G 29/00
[52] U.S. Cl. ........................................ 198/803.9; 414/763
[58] Field of Search ............................. 198/803.7, 803.9; 414/745.9, 746.2, 746.4, 763, 773, 783, 798.9

[56] References Cited

U.S. PATENT DOCUMENTS 3,195,737  7/1965  Melrose ........................... 414/745.9 X
3,627,146  12/1971  Berndt ................................. 414/745.9

*Primary Examiner*—Janice L. Krizek
*Attorney, Agent, or Firm*—Michael D. Bednarek; Browell & Moring LLP

[57] ABSTRACT

The loading device of the present invention is adapted for the high speed handling of lumber pieces, wherein the lumber pieces are fed side-by-side in bulk to the loading device by an inlet conveyor and are delivered by the loading device in a substantially constantly spaced relationship onto an outlet conveyor which carries the lumber pieces to another station, e.g. a classifier. The loading device comprises solely motorized mechanical components, including a number of synchronized cam-actuated tongs for picking up, grasping and transferring the lumber pieces from the inlet to the outlet conveyor. The tongs are mounted on a rotatable wheel and each displaced by a first cam system between open, closed and open positions thereof during each rotation the wheel. A second cam system operates stoppers at the inlet side of the loading device to allow the one-by-one access of the lumber pieces to the loading device with both cam systems being synchronized such that the lumber piece accesses the loading device as the tong appears at the inlet side, wherein the tong is in its open position prior to reaching the inlet side and is adapted thereat to pick up a lumber piece and to then move to its closed position until reaching the outlet conveyor where the tong is returned to its open position thereby releasing the lumber piece onto the outlet conveyor.

10 Claims, 5 Drawing Sheets

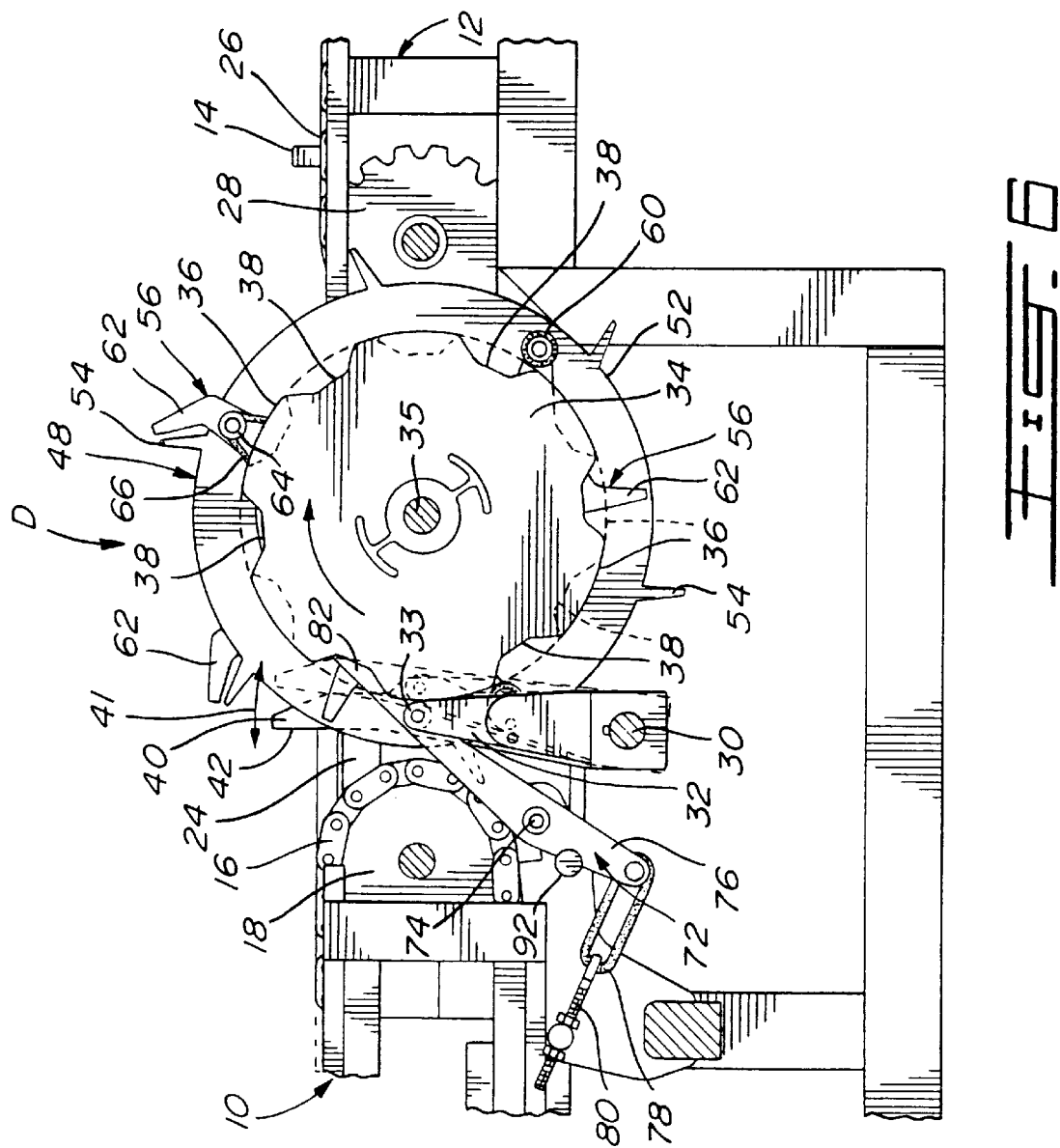

LOADING DEVICE HAVING MULTIPLE TONGS FOR HANDLING LUMBER AND THE LIKE

CROSS-REFERENCE

This application is a continuation of U.S. Ser. No. 08/715,269 filed Sep. 16, 1996, now U.S. Pat. No. 5,752,594.

BACKGROUND OF THE INVENTION

1. Field of the Invention

The present invention relates to lumber handling devices and, more particularly, to a high speed lumber handling device having cam-actuated tongs.

2. Description of the Prior Art

In the art of handling of lumber, such as boards, planks, battens, etc., including eight feet long 2" by 4" wood pieces and the like, it is often necessary to handle the pieces of lumber to separate these pieces one from another and to distribute them on a conveyor, such as a chain conveyor, for instance before these lumber pieces are inspected or classified. Various systems have been proposed to handle these wood pieces, wherein the wood pieces upstream of the system or machine are delivered in bulk such that when loaded onto the machine and then deposited downstream thereof on a conveyor, the pieces are spaced apart from one another to facilitate a further operation. These machines are highly technical and include various hydraulic, pneumatic and/or electronic components and are thus rather complicated, expensive to purchase and to service and difficult to troubleshoot. Also, these machines require that adjustments be made if different thicknesses of lumber pieces are to be handled.

SUMMARY OF THE INVENTION

It is therefore an aim of the present invention to provide an improved lumber handling device.

It is also an aim of the present invention to provide a loading device having multiple tongs for handling lumber and the like.

It is a further aim of the present invention to provide a loading device where the multiple tongs are actuated by cam mechanisms.

It is still a further aim of the present invention to provide a loading device comprising electrically driven mechanical components devoid of pneumatic, electronic and hydraulic components and controls.

Therefore, in accordance with the present invention, there is provided a loading device for the high-speed handling of elongated wood pieces, comprising rotatable wheel means having an inlet side and an outlet side, at least one tong means mounted to said wheel means and adapted to be displaced between open and closed positions during one rotation cycle of said wheel means, selective stop means adjacent said inlet side for ensuring that the wood pieces are fed one-by-one to said wheel means, said tong means being in said open position prior to reaching said inlet side and being adapted thereat to pick up a wood piece and to then move to said closed position until substantially reaching said outlet side where said tong means is adapted to return to said open position thereby releasing the wood piece.

BRIEF DESCRIPTION OF THE DRAWINGS

Having thus generally described the nature of the invention, reference will now be made to the accompanying drawings, showing by way of illustration a preferred embodiment thereof, and in which:

FIG. 6 is a cross-sectional view taken along line 6—6 of FIG. 2.

DESCRIPTION OF THE PREFERRED EMBODIMENTS

Figure 1:
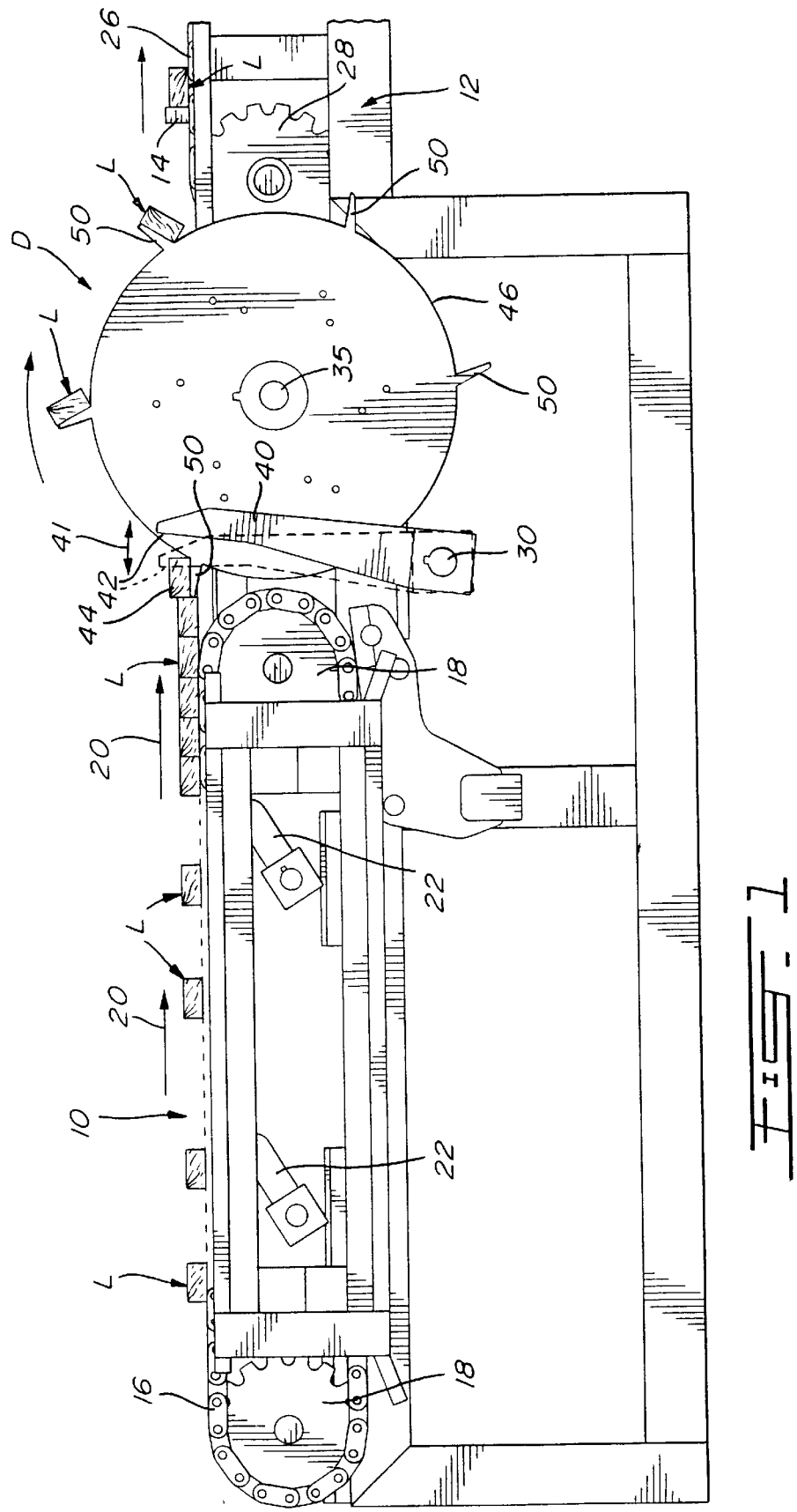
FIG. 1 is a schematic side view of a loading device in accordance with the present invention shown in operation between inlet and outlet chain conveyors.

In accordance with the present invention, FIG. 1 illustrates a loading device D in accordance with the present invention adapted for handling lumber pieces L which are taken from an inlet chain conveyor 10 and delivering these lumber pieces L one by one and in spaced relationship onto an outlet chain conveyor 12. The lumber pieces L are supplied to the loading device D in random position on the inlet chain conveyor 10 and accumulate in an abutting side-by-side relationship just upstream of the loading device D (see FIG. 1). The loading device then picks up by means of cam actuated tongs the lumber pieces L, one by one as seen in FIG. 1, and delivers the lumber pieces L to the outlet chain conveyor 12 where they are released from the tongs such that each lumber piece L is received between successive stoppers 14 provided on the outlet chain conveyor 12 which delivers the lumber pieces L in a regularly distributed arrangement to a next station, such as a classifier, an optimizing machine, or a machine for cutting to the desired length the pieces of timber or lumber, or even for visual inspection, etc.

As the present loading device D can, without adjustment, carry various sizes of lumber pieces, e.g. 2" by 4", 2" by 3", 1" by 6", etc., a mixture of lumber pieces L of different dimensions can be fed to the loading device D and the spaced lumber pieces distributed on the outlet chain conveyors 12 by the present loading device D can be conveyed to a classifier which will appropriately sort out the various lumber pieces L according to size.

Figure 2:
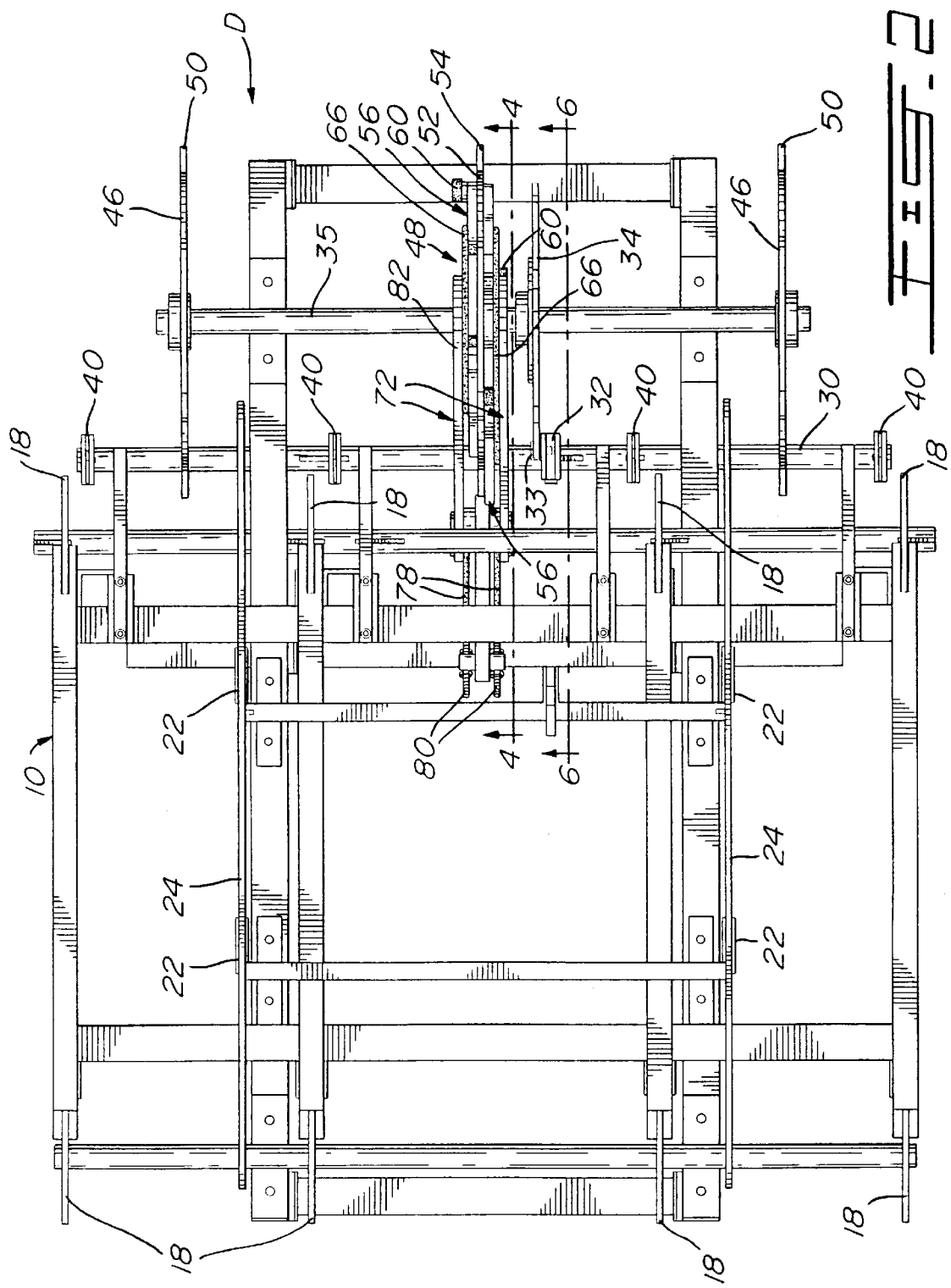
FIG. 2 is a top plan view of the loading device.

As best seen in FIGS. 1 and 2, the inlet chain conveyor 10 comprises four parallel endless chains 16 mounted on sprockets 18 which are rotatably driven by electric motors. The lumber pieces L extend substantially transversely on the chains 16 and are translationally displaced thereby along arrows 20 of FIG. 1 towards the loading device D. If it is desired to interrupt the feed of lumber pieces L to the loading device D without interrupting the movement of the chains 16 and of the loading device D and outlet chain conveyor 14 as they all operate in synchronization, levers 22 (FIG. 1) can be pivoted to raise a pair of longitudinal supports 24 (FIG. 2) above the plane of the upper runs of the chains 16, i.e. the lumber supporting portions thereof, thereby elevating the lumber pieces L which become spaced from the chains 16 and which are thus not driven thereby and which remain stationary on the supports 24 until the levers 22 are reversely actuated to lower the supports 24 and return the lumber pieces L onto the chains 16.

The outlet chain conveyor 12 includes four parallel chains 26 driven by motorized sprockets 28 with the stoppers 14 being fixedly mounted at regular intervals to the chains 26 and with the operation of the loading device D being synchronized with the outlet chain conveyor 12 such that one single lumber piece L falls between each successive set of stoppers 14 provided on the chains 26.

Now turning to the loading device D, it must first be generally noted that it is basically made up of two coacting and precisely synchronized mechanisms, that is a first mechanism for picking up the lumber pieces L, one at a time, from the inlet chain conveyor 10 and for releasing each lumber piece L on the outlet chain conveyor 12, while a second mechanism prevents the incoming lumber pieces L from accessing the lumber carrying first mechanism of the loading device D until the first mechanism is ready to pick up a new lumber piece L from the inlet chain conveyor 10. Both mechanisms are actuated by distinct cam systems with both cam systems and the inlet and outlet chain conveyors 10 and 12 being obviously appropriately all synchronized.

Figure 3:
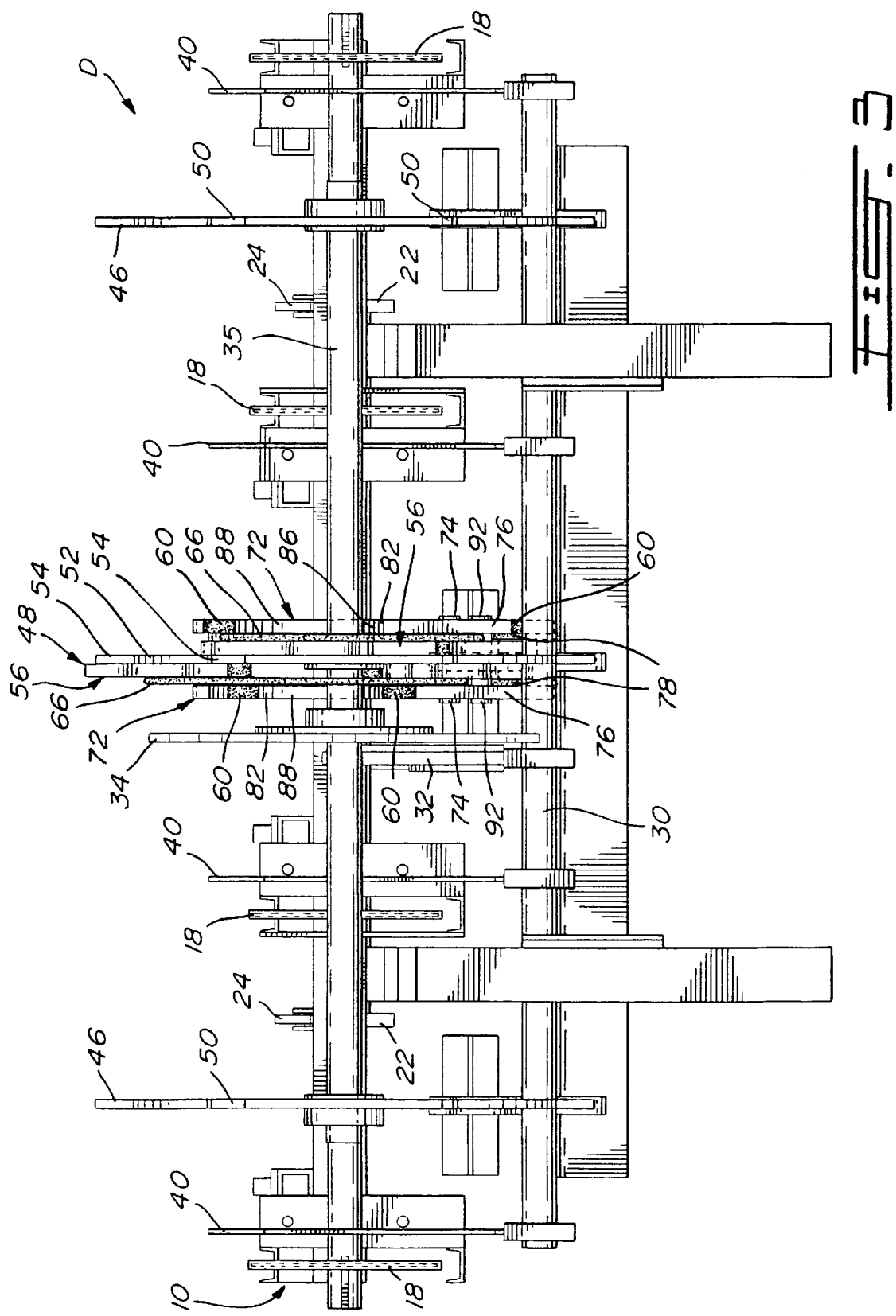
FIG. 3 is a front elevational view of the loading device of FIG. 2.

In more details, and with reference to FIGS. 1, 3 and 6, the aforementioned second mechanism comprises a shaft 30 journaled to the frame of the device D such as to pivot relative thereto, a cam lever 32 fixedly mounted at its lower end to the shaft 30 and provided with a roller 33 at its upper end, a rotatable cam wheel 34 mounted for rotation to a motor driven shaft 35 and defining successive peaks 36 and valleys 38 (see FIG. 6), and four vertical stop members 40 (see FIGS. 1 and 3) fixedly mounted at their lower ends to the shaft 30 and defining at their upper ends lumber abutting surfaces 42. The stop members 40 oscillate between two positions (see arrows 41 in FIG. 1) and, more particularly, a lumber stopping position shown in full lines in FIG. 6 and in broken lines in FIG. 1, and a lumber release position shown in broken lines in FIG. 6 and in full lines in FIG. 1.

The oscillation of the stop members 40 results from the movement of the cam lever's roller 33 along the periphery of the cam wheel 34, that is along the peaks 36 and valleys 38 thereof. It is noted that the cam lever 32 is biased towards the cam wheel by a tensioned elastic member or a spring which are not herein shown such as to ensure that the roller 33 follows the cam wheel 32 at all times.

Indeed, the back-and-forth movement of the cam lever 32 between its positions illustrated in full and broken lines in FIG. 6 causes the shaft 30 and thus the stop members 40 to oscillate. When the roller 33 runs along the peaks 36 (see full lines in FIG. 6), the stop members 40 are in their lumber stopping position, whereas when the roller 33 runs along the valleys 38 (see broken lines in FIG. 6), the stop members 40 are their retracted or lumber release position such as to allow a downstream-most lumber piece 44 (see FIG. 1) located on the inlet chain conveyor 10 to access the aforementioned lumber carrying first mechanism of the loading device D and thus to be picked up thereby and then transported to the outlet chain conveyor 12.

The lumber carrying first mechanism comprises in the illustrated embodiment a pair of end lumber carrying wheels 46 and an intermediate lumber grasping assembly 48 all mounted to the shaft 35 for rotation therewith along with the cam wheel 34 such as to simplify the synchronization of all of these components. Six lumber carrying fingers 50 angularly and equidistantly project from the periphery of each carrying wheel 46, as best seen in FIG. 1 which also illustrates the interaction between the fingers 50 and the lumber pieces L from when each lumber piece L is picked up from the inlet chain conveyor 10 until it is released under gravity forces from the fingers 50 and deposited onto the outlet chain conveyor 12.

Figure 4:
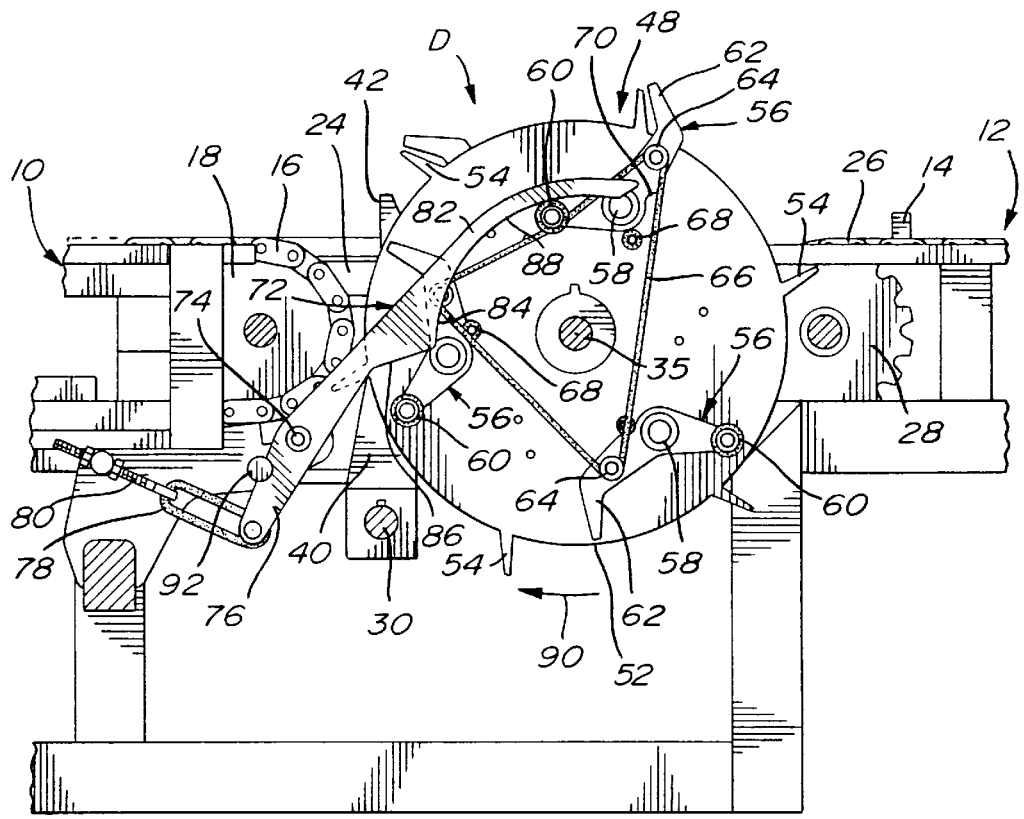
FIG. 4 is a cross-sectional view taken along line 4—4 of FIG. 2.
Figure 5:
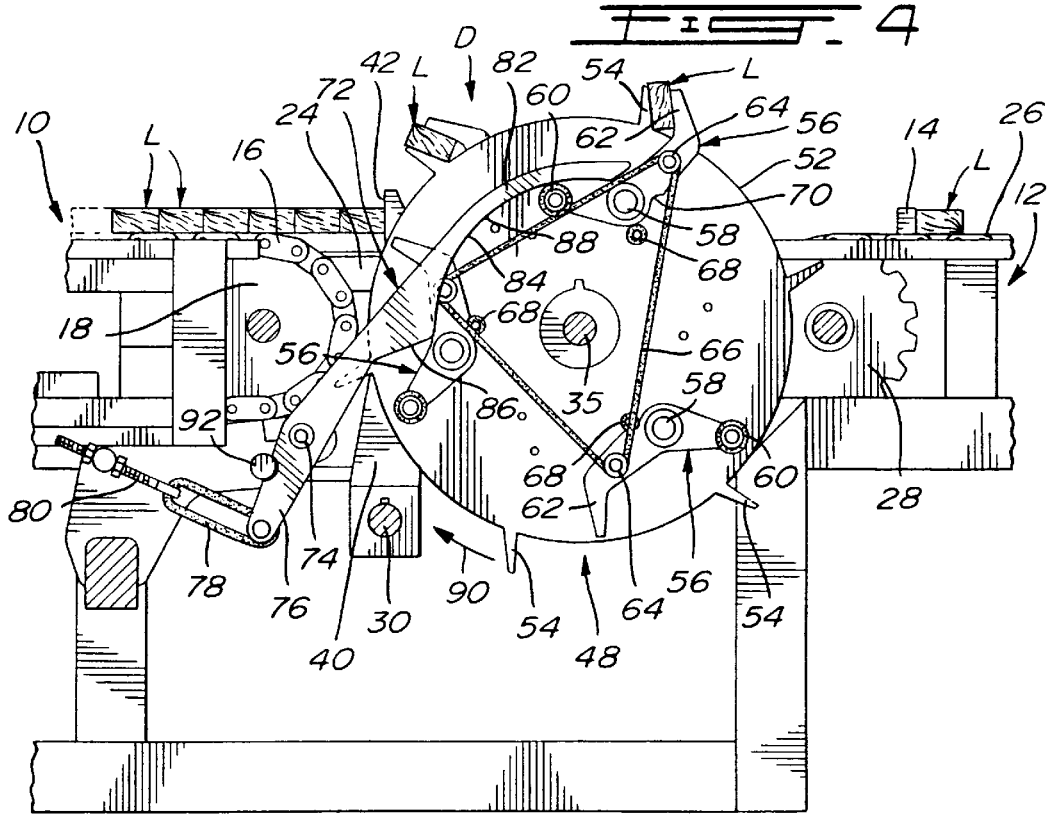
FIG. 5 is a cross-sectional view similar to FIG. 4 but showing the loading device in operation, that is in the process of handling lumber pieces.

Now referring mainly to FIGS. 3 to 5, the lumber grasping assembly 48 comprises a central wheel 52 adapted to rotate with the shaft 35 and provided with six lumber carrying fingers 54 which angularly and equidistantly project from the periphery of the central wheel 52 (similarly to the fingers 50 of the carrying wheels 46). On each side of the central wheel 52, there are provided three jaws 56 pivotally mounted at 58 to the central wheels and displaceable between a retracted position (see the lowermost and left jaws 56 in FIGS. 4 and 5) and a lumber holding position (see the uppermost jaw 56 in FIGS. 4 and 5). The two sets of three jaws 56 are offset from another such that each jaw 56 cooperates in the aforementioned lumber holding position with a respective finger 54 to form a tong adapted to pick up one of the lumber pieces L from the inlet chain conveyor 10 and securely hold it until the tong releases this lumber piece L such that it is deposited onto the outlet chain conveyor 12.

Each jaw 56 includes at an inner end thereof a roller 60 and defines at an outer end thereof a finger 62 which cooperates with a respective finger 54 integrally projecting from the central wheel 52. Adjacent to the fingers 62, the jaws 56 are each provided with a pulley 64 and a tensioning band 66 is positioned triangularly around the pulleys 64 of each set of three jaws 56, i.e. there is a tensioning band 66 on each side of the central wheel 52. The tensioning bands 66 biasedly urge the jaws 56 towards their retracted position which is limited by studs 68 which engage and nest, in the retracted position, into a shallow recess 70 defined on the jaw 56 (see the uppermost jaw 56 in FIGS. 4 and 5).

The synchronized pivotal displacement of a given jaw 56 from its retracted to its lumber holding position is ensured by a cam lever 72 while its return to the retracted position again results from its respective tensioning band 66. There is provided a cam lever 72 on each side of the central wheel 52 such that each cam lever 72 acts on a respective set of three jaws 56.

The two cam levers 72 are each pivotally mounted at 74 to the frame of the loading device D and each include a lower end 76 which is strongly biased by a tensioning band 78, the tension of which being adjustable with threaded adjustment rods 80, this adjustment being required, for instance, to vary the grasping force at the tongs to accommodate particular lumber sizes and/or weights. Each cam lever 72 also includes an elongated upper end 82 which defines an inner cam surface 84 having two sections, that is an actuating surface 86 and a holding surface 88.

When the central wheel 52 rotates as per arrow 90 in FIGS. 4 and 5, the roller 60 of a jaw 56 in its retracted position will come into contact with the actuating surface 86 of the cam lever 72 which will almost remain stationary in view of the tension in the tensioning band 78 thereby causing the pivot of the jaw 56 about its pivot 58 as the roller 60 runs along the actuating surface 86 towards the lumber holding position of the jaw 56.

The pivot of the jaw 56 takes place in a synchronized manner while the aforementioned upstream-most lumber piece L on the inlet chain conveyor 10 is being picked up by one of the fingers 54 of the central wheel 52 as well as by a corresponding finger 50 on each of the two carrying wheels 46. With the lumber piece positioned on the fingers 50 and 54, the finger 62 of the jaw 56 clamps down onto the lumber piece L as a result of the pivot of the jaw 56 caused again by its roller 60 displacing along the actuating surface 86 towards the holding surface 88.

When the roller 60 reaches the holding surface of the cam lever 72, the lumber piece L is firmly grasped by the tong 54,62 (see FIG. 5) and stays as such until the roller 60 reaches the end of the arcuate holding surface 88, after which the roller 60 is released from the holding surface 88 thereby allowing the tensioning band 66 to return the jaw 56 to its retracted position. This obviously releases the lumber piece L from the tong 54, 62, whereby the lumber piece L drops onto the outlet chain conveyor 12 between two consecutive sets of corresponding stoppers 14.

It is easily understood that the tensioning bands 66 and 78 allow for the tongs to grasp and hold lumber pieces L of various thicknesses. It is noted with reference to FIGS. 4 and 5 that a limit pin 92 limits the pivot of each cam lever 72 under the bias of the tensioning band 78 and that the lower end 76 of the cam lever will separate from this limit pin 92 more or less depending on the thickness of the lumber piece L held by the tong (see small space between the limit pin 92 and the lower end 76 in FIG. 5 where a lumber piece L is held by a tong as opposed to FIG. 4 where no lumber is held thereby).

It is also readily understood that the stop members 40 prevent the upstream-most lumber piece from contacting the peripheral arcuate portions extending between consecutive fingers 54 of the central wheel 52 so that this lumber piece does not "climb" on the arcuate portions between "pick-ups" of lumber pieces by the fingers 50 and 54. The stop members 40 are synchronized with the carrying wheels 46 and the grasping assembly 48 and its central wheel 52 such as to release the upstream-most lumber piece and allow it to reach the central wheel 52 just as the fingers 50 and 54 are approaching the level of this lumber piece such that the latter can be properly and timely picked up thereby.

It is further understood that the number and relative position of the lumber carrying wheels 46 and the lumber grasping assemblies 48 can be varied according to specific requirements, e.g. unusual lumber length and/or weight, etc.

Furthermore, the lumber grasping assembly 48 including its components rotating with the shaft 35 and its cam lever 72 (including the tensioning band 78 and tension adjusting rods 80) are all encased in a housing (which is not herein shown for illustration purposes of the details of the grasping assembly 48) with basically only the fingers 54 and 62 extending therethrough, that is through a central slot defined in the housing above the conveyors 10 and 12 and radially opposite the central wheel 52 and the jaws 56.

Tests conducted on the present loading device D have been conclusive while handling 60 lumber pieces per minute at minimum speed and stunningly up to 220 pieces per minute at maximum speed. The same jaws 56 can accommodate lumber pieces L having a thickness ranging, for instance, between 1" and 3.25", while a simple change in the type of jaw 56 allows for the handling of pieces of up to 8" in thickness. Lumber pieces of 2" by 10" and of a length varying from 6' to 16' have been successfully handled by the present loading device D.

The present loading device is exempt of complicated hydraulic, pneumatic and/or electronic components and controls. It has shown in tests to be very dependable.

I claim:

1. A loading device for the high-speed handling of elongated pieces, comprising rotatable wheel means having an inlet side and an outlet side, at least one tong means mounted to said wheel means and adapted to be displaced between open and closed positions during one rotation cycle of said wheel means, selective stop means adjacent said inlet side for ensuring that the elongated pieces are fed one-by-one to said wheel means, said tong means being in said open position prior to reaching said inlet side and being adapted thereat to pick up an elongated piece and to then move to said closed position until substantially reaching said outlet side where said tong means is adapted to return to said open position thereby releasing the elongated piece, wherein said tong means comprise first and second clamping means capable of relative displacement between said open and closed positions with at least said second clamping means being biased relative to said first clamping means, said second clamping means being adapted to selectively engage guide means for displacing said first and second clamping means to said closed position with said guide means being resiliently displaceable for allowing said tong means to hold elongated pieces of different transverse dimensions, wherein said first clamping means are fixed to said wheel means and extend from a periphery thereof and in a plane of said wheel means, said second clamping means each having inner roller means and outer finger means, said second clamping means being pivotally mounted on at least one side of said wheel means between said roller means and said finger means with said finger means cooperating with said first clamping means to retain the elongated piece therebetween in said closed position, first biasing means urging said second clamping means toward said open position, wherein when said roller means engage said guide means, said second clamping means is displaced to said closed position against said first biasing means, and wherein when said roller means disengages from said guide means, said first biasing means cause said second clamping means to return to said open position.

2. A loading device as defined in claim 1, wherein said guide means comprise pivotally mounted lever means comprising second biasing means for resiliently urging said lever means against said roller means and said second clamping means toward said closed position, wherein said second biasing means are sufficiently resilient such that when said roller means engage said lever means, said second clamping means displace to said closed position but with said second biasing means being capable of yielding in said closed position for allowing said first and second clamping means to be differently spaced from each other in said second position depending on the transverse dimensions of the elongated pieces to be handled.

3. A loading device as defined in claim 2, wherein said lever means defines an actuating surface followed by an arcuate holding surface both adapted to engage said roller means, wherein said actuating surface causes said second clamping means to pivot to said closed position and thus grasp with said first clamping means the elongated piece, whereas said holding surface retains said second clamping means in said closed position while the elongated piece is displaced by said wheel means and once said roller means leaves said holding surface, said first biasing means return said second clamping means to said open position thereby releasing the elongated piece.

4. A loading device as defined in claim 1, wherein said first biasing means comprise a tensioning band which forms a closed loop and which is engaged to pin means extending from said second clamping means located on said same side of said wheel means, said pin means being located on a same side of a pivot axis of said second clamping means as said finger means.

5. A loading device as defined in claim 1, wherein first and second sets of second clamping means are provided respectively on first and second sides of said wheel means, said first and second sets comprising a same number of second clamping means and being offset such that said second clamping means are equally spaced while alternating between said first and second sets, there being on said wheel means twice said number of said first clamping means evenly distributed along said periphery.

6. A loading device for the high-speed handling of elongated pieces, comprising rotatable wheel means having an inlet side and an outlet side, at least one tong means mounted to said wheel means and adapted to be displaced between open and closed positions during one rotation cycle of said wheel means, selective stop means adjacent said inlet side for ensuring that the elongated pieces are fed one-by-one to said wheel means, said tong means being in said open position prior to reaching said inlet side and being adapted thereat to pick up an elongated piece and to then move to said closed position until substantially reaching said outlet side where said tong means is adapted to return to said open position thereby releasing the elongated piece, wherein said tong means comprise first and second clamping means capable of relative displacement between said open and closed positions with at least said second clamping means being biased relative to said first clamping means, said second clamping means being adapted to selectively engage guide means for displacing said first and second clamping means to said closed position with said guide means being resiliently displaceable for allowing said tong means to hold elongated pieces of different transverse dimensions, wherein biasing means are provided for resiliently engaging said guide means with said second clamping means in said closed position, wherein said biasing means are sufficiently resilient such that when said second clamping means engage said guide means, said second clamping means displace to said closed position but with said biasing means being capable of yielding in said closed position for allowing said first and second clamping means to be differently spaced from each other in said second position depending on the transverse dimensions of the elongated pieces to be handled.

7. A loading device for the high-speed handling of elongated pieces, comprising rotatable wheel means having an inlet side and an outlet side, at least one tong means mounted to said wheel means and adapted to be displaced between open and closed positions during one rotation cycle of said wheel means, selective stop means adjacent said inlet side for ensuring that the elongated pieces are fed one-by-one to said wheel means, said tong means being in said open position prior to reaching said inlet side and being adapted thereat to pick up an elongated piece and to then move to said closed position until substantially reaching said outlet side where said tong means is adapted to return to said open position thereby releasing the elongated piece, wherein said tong means comprise first and second clamping means capable of relative displacement between said open and closed positions with at least said second clamping means being biased relative to said first clamping means, said second clamping means being adapted to selectively engage guide means for displacing said first and second clamping means to said closed position with said guide means being resiliently displaceable for allowing said tong means to hold elongated pieces of different transverse dimensions, wherein there is provided at least one carrying wheel on each side of said wheel means, each said carrying wheel being mounted for rotation with said wheel means and comprising supports for the elongated piece located opposite said tong means such that any elongated piece is held captive by said tong means while being simultaneously further supported outwardly of said wheel means by said supports of said carrying wheels.

8. A loading device for the high-speed handling of elongated pieces, comprising rotatable wheel means having an inlet side and an outlet side, at least one tong means mounted to said wheel means and adapted to be displaced between open and closed positions during one rotation cycle of said wheel means, selective stop means adjacent said inlet side for ensuring that the elongated pieces are fed one-by-one to said wheel means, said tong means being in said open position prior to reaching said inlet side and being adapted thereat to pick up an elongated piece and to then move to said closed position until substantially reaching said outlet side where said tong means is adapted to return to said open position thereby releasing the elongated piece, wherein said tong means comprise first and second clamping means capable of relative displacement between said open and closed positions with at least said second clamping means being biased relative to said first clamping means, said second clamping means being adapted to selectively engage guide means for displacing said first and second clamping means to said closed position with said guide means being resiliently displaceable for allowing said tong means to hold elongated pieces of different transverse dimensions, wherein said stop means comprise at least one stop member displaceable between release and stop positions for allowing an elongated piece to timely reach said tong means in said open position such as to be picked up thereby and for holding the elongated piece away from said wheel means between successive tong means, respectively.

9. A loading device as defined in claim 8, wherein a lever fixedly mounted to a rotatable idle shaft is resiliently urged against a cam wheel which synchronously rotates with said wheel means and which defines recesses which cause said lever and said shaft to oscillate, each said stop member being fixedly mounted to said shaft such as to oscillate therewith and between said release and stop positions.

10. A loading device for the high-speed handling of elongated pieces, comprising rotatable wheel means having an inlet side and an outlet side, at least one tong means mounted to said wheel means and adapted to be displaced between open and closed positions during one rotation cycle of said wheel means, selective stop means adjacent said inlet side for ensuring that the elongated pieces are fed one-by-one to said wheel means, said tong means being in said open position prior to reaching said inlet side and being adapted thereat to pick up an elongated piece and to then move to said closed position until substantially reaching said outlet side where said tong means is adapted to return to said open position thereby releasing the elongated piece, wherein said tong means comprise first and second clamping means capable of relative displacement between said open and closed positions with at least said second clamping means being biased relative to said first clamping means, said second clamping means being adapted to selectively engage guide means for displacing said first and second clamping means to said closed position with said guide means being resiliently displaceable for allowing said tong means to hold elongated pieces of different transverse dimensions, wherein inlet and outlet conveyors are provided respectively at said inlet and outlet sides of said wheel means, wherein said outlet conveyor is provided with spaced apart stops and is synchronized with respect to said wheel means such that a single elongated piece is deposited between each pair of adjacent ones of said stops by said tong means as said tong means displace from said closed position to said open position.

* * * * *